(12) United States Patent
Cone et al.

(10) Patent No.: US 11,741,170 B2
(45) Date of Patent: *Aug. 29, 2023

(54) SEARCH ENGINE METHOD AND SYSTEM UTILIZING A SOCIAL NETWORK TO INFLUENCE SEARCHING

(71) Applicant: Eurekster Search Solutions LLC, Dana Point, CA (US)

(72) Inventors: Julian Malcolm Cone, Christchurch (NZ); Gary Lee Franklin, Christchurch (NZ); Michael Arthur Grantham, Christchurch (NZ); Wayne Alistair Munro, Christchurch (NZ); Grant James Ryan, Christchurch (NZ); Shaun William Ryan, Christchurch (NZ); William Ferguson Stalker, Christchurch (NZ)

(73) Assignee: Eurekster Search Solutions LLC, Dana Point, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/813,152

(22) Filed: Mar. 9, 2020

(65) Prior Publication Data

US 2020/0210495 A1 Jul. 2, 2020

Related U.S. Application Data

(63) Continuation of application No. 15/273,401, filed on Sep. 22, 2016, now Pat. No. 10,585,950, which is a
(Continued)

(30) Foreign Application Priority Data

Sep. 22, 2003 (NZ) ........................................ 528385

(51) Int. Cl.
*G06F 16/00* (2019.01)
*G06F 16/951* (2019.01)
(Continued)

(52) U.S. Cl.
CPC .......... *G06F 16/951* (2019.01); *G06F 16/335* (2019.01); *G06F 16/3334* (2019.01);
(Continued)

(58) Field of Classification Search
CPC combination set(s) only.
See application file for complete search history.

(56) References Cited

U.S. PATENT DOCUMENTS

| 6,006,225 A * | 12/1999 | Bowman | ............. G06F 16/2428 |
| | | | 707/999.005 |
| 7,890,581 B2 * | 2/2011 | Rao | ........................ H04W 4/21 |
| | | | 709/204 |
| 8,510,287 B1 * | 8/2013 | Wu | ........................ G06F 16/00 |
| | | | 707/706 |

(Continued)

FOREIGN PATENT DOCUMENTS

EP 1288795 A1 * 3/2003 ......... G06F 16/9535

*Primary Examiner* — Farhan M Syed
(74) *Attorney, Agent, or Firm* — David B. Tingey; Bryant J. Keller; Kirton McConkie

(57) ABSTRACT

A search engine system capable of displaying indicative information to a user from searches performed by entities connected directly or indirectly to the user, wherein said system includes at least one host computer processor connectable to one or more network(s), a database accessible over said network(s), a plurality of data input devices connectable to said network(s) said search engine being accessible over said network(s).

19 Claims, 6 Drawing Sheets

Related U.S. Application Data continuation of application No. 13/334,816, filed on Dec. 22, 2011, now Pat. No. 9,489,464, which is a continuation of application No. 13/029,780, filed on Feb. 17, 2011, now abandoned, which is a continuation of application No. 10/573,401, filed as application No. PCT/NZ2004/000228 on Sep. 22, 2004, now abandoned.

(51) Int. Cl.
  *G06F 16/335* (2019.01)
  *G06F 16/33* (2019.01)
  *G06F 16/9535* (2019.01)
  *G06F 16/9032* (2019.01)
  *G06F 16/435* (2019.01)

(52) U.S. Cl.
  CPC .... *G06F 16/90324* (2019.01); *G06F 16/9535* (2019.01); *G06F 16/435* (2019.01)

(56) References Cited

U.S. PATENT DOCUMENTS

| | | | | |
|---|---|---|---|---|
| 8,868,538 | B2* | 10/2014 | Mital | G06F 16/9535 715/810 |
| 2004/0042599 | A1* | 3/2004 | Zaner | H04M 17/103 379/142.01 |
| 2004/0078214 | A1* | 4/2004 | Speiser | G06Q 30/0625 705/347 |
| 2006/0136419 | A1* | 6/2006 | Brydon | G06Q 10/107 707/999.009 |
| 2008/0133716 | A1* | 6/2008 | Rao | H04L 67/306 709/227 |
| 2009/0157664 | A1* | 6/2009 | Wen | G06Q 10/047 707/999.005 |
| 2010/0023508 | A1* | 1/2010 | Zeng | G06F 16/9535 707/E17.014 |
| 2010/0211558 | A1* | 8/2010 | Bonabeau | G06Q 30/0257 707/706 |
| 2011/0225235 | A1* | 9/2011 | Schmidt | H04W 4/029 709/224 |
| 2011/0295852 | A1* | 12/2011 | Wang | G06F 16/9535 707/E17.014 |
| 2012/0150888 | A1* | 6/2012 | Hyatt | G06F 16/335 707/758 |
| 2012/0209839 | A1* | 8/2012 | Andrews | H04W 4/029 707/E17.014 |
| 2012/0295640 | A1* | 11/2012 | Mei | G06F 16/24578 455/456.3 |
| 2014/0344718 | A1* | 11/2014 | Rapaport | H04L 51/52 715/753 |
| 2015/0193498 | A1* | 7/2015 | Weatherhead | G06F 16/00 707/722 |
| 2016/0034588 | A1* | 2/2016 | Hyatt | G06F 16/337 707/733 |

* cited by examiner

FIG. 4

Welcome to Search Engine 21

New users : Sign Up

First name:
Last name:
Preferred email:
Country: New Zealand
Choose Password:

(?) Why?

20

☑ I agree to the Terms and Conditions

☐ Remember my login on this computer

Sign Up

Existing users : Login

Enter your email and password to login

Email: testboy@ com
Password: ******

19

☑ Remember my login on this computer

Login

Forgotten your password?

Home  About  Contact Us  Sign Up / Login

FIG. 5

Search Engine ← 22

Invite your contacts to join your personal network at

From: Testboy@ com ▽   Your email address list is private and we never send unsolicited email.

Enter email addresses, one line or comma separated

To:

Review by
T R U S T • e
site privacy statement

Subject: Testboy@ com

Message: Hi

This is a cool new search site. Check it out:
http://

The beta password you need to enter is " ".

_testJohn

Save my personal message for future use ☐    Send Email

SEARCH ENGINE METHOD AND SYSTEM UTILIZING A SOCIAL NETWORK TO INFLUENCE SEARCHING

CROSS-REFERENCE TO RELATED APPLICATIONS

This is a continuation of U.S. patent application Ser. No. 15/273,401, filed on Sep. 22, 2016, which is a continuation of U.S. patent application Ser. No. 13/334,816, filed on Dec. 22, 2011, which is a continuation of U.S. patent application Ser. No. 13/029,780, filed on Feb. 17, 2011, which is a continuation of U.S. patent application Ser. No. 10/573,401, filed on Jan. 22, 2007, which is a national stage entry of PCT/NZ04/00228, filed on Sep. 22, 2004, and which claims priority to New Zealand Patent Application No. 528385, filed Sep. 22, 2003; the entire disclosures of which are each incorporated herein by reference.

TECHNICAL FIELD

The present invention relates generally to a means for enhancing a search engine and in particular, providing search-related information derived from one or more entities known to the user.

BACKGROUND ART

The interconnectivity of individuals and organisations has increased exponentially in recent times with the advent of various telecommunication means, including the Internet. The very success in information availability and distribution afforded by the Internet has placed a premium on effective means of identifying information relevant or interesting to the user. Internet search engines are the most prevalent means of extracting relevance from the ever expanding wealth of internet material. However, the majority of search engines suffer from numerous shortcomings.

The sheer volume of information available on even the most esoteric subjects requires search engines to filter and prioritise the search results. The mechanisms by which this ranking is achieved include:

a) Keyword frequency and meta tags;
b) Professional editors manually evaluating sites;
c) How much advertisers are prepared to pay, and
d) Measuring which web-sites webmasters think are important. This is done by link analysis, which gives more weighting to sites dependant on what other sites are linked to them.

U.S. Pat. No. 6,421,675 (enclosed herein by reference) discloses a means of refining searches according to the behaviour of previous users performing the same search. While this removes the web-site from its sole dependency of the above criteria a)-d) for its ranking, it is still driven by the influence of the whole web populous, whose interests and tastes may differ greatly from a given individual user.

It would be desirable to provide a means of influencing the ranking or weighting of search results according to the preferences of entities (individuals, groups or organisations) deemed of more relevance or importance to the user.

PCT/NZ02/00199 (incorporated herein by reference) also by the present applicant discloses a personal contact network system whereby a user may form a network of contacts known either directly or indirectly to the user. The network may be used for a variety of applications and takes advantage of the innate human trait to give a higher weighting to the opinions of those entities with whom a common positive bond is shared, such as friendship.

As outlined in patent application PCT/NZ02/00199, incentives to restrict the distribution and flow of information within a network (or the search results of a search engine) include obtaining some form of filtering of irrelevant, useless, unwanted, offensive, intrusive, or in any way undesirable information or interaction with other nodes/entities. Humans consciously and subconsciously already utilise such filtering in their daily life by placing greater weighting on information from friends and acquaintances than from unfamiliar sources.

Throughout virtually every aspect of human life, economic, social, personal and business decisions are either directly or indirectly affected by the preferences, tastes and actions of our friends, colleagues and acquaintances. This is in contrast to widely accepted economic theory in the fields of, for example, consumer purchases where it is assumed individuals make rational choices based upon the available product or service information. In actual fact, a recommendation or an adverse comment from a close trusted acquaintance regarding a specific product will often override other factors in a commercial purchase decision, rightly or not. There are many other areas in which the opinions of respected acquaintances or even organisations can affect the decision making of individuals or organisations.

Examples of just a few applications or activities in which trusted or respected contacts or recommendations play a significant role include seeking employment and filling job vacancies, investment opportunities, academic co-operation, finding accommodation or people to share accommodation with, buying and selling goods and services, arranging social/sporting functions, finding friendship, romantic and/ or social relationships and so forth.

Contemporary living has confronted many individuals with a daily surplus of information. This bewildering array of choices and decisions vies for the individual's attention in almost every aspect of their work, recreation, and social lives. The vast majority of information sources received by most individuals is biased to some extent by commercial interests. Consequently, there is at least the perception the information may be incomplete, misleading or false. The lack of independent objectivity from these information sources leads to scepticism and/or a sense of futility, helplessness, or ambivalence in obtaining worthwhile advice. In contrast, a recommendation by a trusted friend of a particular product, service or the like, is likely to be given far greater weighting. Such recommendations will often be accorded far greater significance than any number of expensive, professionally produced, and theoretically compelling advertisements/product recommendations.

An individual may seek a friend's opinion on a variety of issues, aside from commercial purchase issues. The choice of plumbers, dentists, lawyers and other suppliers for example, may be strongly influenced by personal recommendation. Whilst such specific choices may only arise infrequently, friends and acquaintances are often in frequent contact and may cover a wide range of matters, including opinions/recommendations on issues such as books, films, entertainment, restaurants, and many others.

It would thus be desirable to harness the recommendations, opinions and discriminatory abilities of a user's friends, acquaintances (or any other entity known directly or indirectly to the user) to enhance the results of a search engine. It would also be desirable to provide a user with indicative information derived from the search activities conducted by the members of the user's unique personal network.

All references, including any patents or patent applications cited in this specification are hereby incorporated by reference. No admission is made that any reference constitutes relevant prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

It is an object of the present invention to address the foregoing problems or at least to provide the public with a useful choice.

Further aspects and advantages of the present invention will become apparent from the ensuing description which is given by way of example only.

DISCLOSURE OF INVENTION

According to one aspect, there is provided a search engine system capable of displaying indicative information to a user from searches performed by one or more entities connected directly or indirectly with the user, In one embodiment, said entities are 'user contacts'.

According to a further aspect, the present invention includes a system providing the user with a private personal contacts network of user contacts.

As used herein, the term 'entity' or 'entities' refers to any individual, family, personal or organised network, organisation, club, society, company, partnership, religion, or entity that exists as a particular and discrete unit.

The term 'search engine' is not necessarily restricted to Internet search engines and may also include any other electronic data search systems for interrogating databases and or networks. Although the present invention is described herein with respect to an Internet search engine, it should be understood this is for exemplary purposes only and the invention is not necessarily limited to internet application.

Preferably, each user contact includes a connection factor indicative of the degree of separation between the user contact and the user.

Preferably, said private personal contacts network provides interrelationship context information between said entities and/or between a user contact and the user, said interrelationship context information including said connection factor and optionally one or more entity attributes.

Preferably, said system entity attributes include at least one identifying characteristic and optionally, information regarding personal details, factors or interests; friends; relations; school alumni; employment factors; business colleagues; professional acquaintances; sexual preferences, persuasions, or proclivities; sporting interests; entertainment, artistic, creative or leisure interests; travel interests, commercial, religious, political, theological or ideological belief or opinions; academic, scientific, or engineering disciplines; humanitarian, social, security/military or economic fields and any combination of same.

Searches include any interrogation of a database via a network, in particular a search of web-sites via the internet.

Preferably, each search includes user inputted keywords (or "search tag keywords") and an output of search results.

Keywords may include one or more words, phrases, images and/or any other alphanumeric characters.

In its broadest sense, the present invention provides two forms of indicative information, namely search suggestions for "search tags") and search results weighting. Whilst both forms of information are known, neither has been previously derived from the search activities of the user contacts.

Thus, according to a further aspect of the present invention, the indicative information includes search suggestions, and/or search results weighting derived from searches, search results, or other network/internet-related activities of the user contacts.

This enables a powerful insight into the activities of the user contacts which may be of direct relevance for a variety of reasons. In the case of close friends (i.e. direct contacts) the suggestions are likely to be in areas of similar interest to the user, or of interest purely due to the existing relationship between the entities. Similarly, if the linking interrelationship context information between the entities and the user is a common entity attribute of membership of a common organisation such as a large company for example, the suggestions from the other entities may be of relevance for commercial purposes.

According to one embodiment, said suggestions include, but are not restricted to;

recent searches denoting the most recent keywords or search results (such as a list of web pages) associated with the keywords used by the user contacts;

recent web-sites denoting the most recent web sites accessed by the user contacts either directly, or via recent searches;

popular web-sites denoting a ranking of web sites most regularly visited by, and/or recommended by the user contacts;

popular searches denoting a ranking of the most popular keywords or search results associated with the keywords used by the user contacts, high-flying searches denoting a list of keywords or search results associated with the keywords ranked according to their rate of increase in the popular searches ranking.

high-flying web-sites denoting a list of web-sites ranked according to their rate of increase in the popular web-sites ranking.

popular or recently accessed paid web listings.

According to a further aspect of the present invention, the suggestions may be based on a selective input from the user contacts filtered according to at least one filter criteria including the elapsed period since the suggestion creation, the interrelationship context information, the connection factor and/or entity attributes of the contributing user contact The suggestions may be displayed adjacent the search results or as an optional toolbar or window with corresponding labelling or some generic terms such as "What's Hot" or the like.

In order that very popular suggestions do not dominate for prolonged periods, each suggestion may have an associated decay factor. The decay factor may be a number between 0 and 1 and be varied according to the nature of the suggestion is so that the perceived popularity does not last indefinitely.

An automatic human response to viewing a listing or ranking is to perceive greater importance of the results at the top of the list, even if the order of the listing is stated as of being random or un-prioritised. Thus, to overcome this inherent bias, greater weighting may be applied to listings such as the search results or the suggestions according to their position down a list, when calculating their perceived popularity.

The present invention may make use of the private personal contacts network system described in the earlier co-pending PCT application PCT/NZ02/00199, which discloses means for creating such a network, operating same, and a range of possible applications. Numerous methods of enhancing the quality of the search results provided by search engines according to particular search queries are known, including those disclosed in the applicant's earlier patents U.S. Pat. No. 6,421,675, US10/5914, U.S. Ser. No. 10/213,017 NZ518624 PCT/NZ02/00199 and NZ528385, which may be utilised by the present invention and thus incorporated herein by reference.

Preferably, in addition to a connection factor indicative of the separation between an entity and the user, said interrelationship context information optionally also includes a connection factor indicative of the separation between user contacts in said private personal contacts network. It will be appreciated that there is a distinct difference in the present invention between organised networks and personal contacts networks. An organised network forms a group/organisation with defined memberships who all have a common aim, or interest such as, commercial organisations, companies, corporations or groupings; political parties; academic or engineering institutes; sporting bodies and so forth. Thus, all organised network members have at least one common entity attribute, i.e. membership of the organised network.

In contrast, a personal contacts network is formed from contacts with friends and colleagues that are unique to an individual. Thus, an individual user of the present invention may be linked to other entity's personal contacts networks and be linked (or even be a member of) organised networks. The present invention provides the flexibility to regard organised networks such as a commercial company or an institute of engineers as a single user contact with various entity attributes relating to the whole company/organisation, an/or to consider the individual members of the organised networks as individual user contacts with at least one common entity attribute. Which of these options is followed may be varied according to the nature of the search being undertaken by the user.

Preferably, access to the interrelationship context information between the user and said entities may be restricted. According to one aspect of the present invention, said restricted access is defined by the user.

Preferably, each said identifying characteristic includes the entity's name and preferably a means of contacting the entity, including an e-mail address; telephone and/or facsimile number; postal address and/or any communication means capable of individually communicating with the entity or any combination of such means.

Preferably, said identifying characteristics also optionally include at least one of said entity attributes.

Optionally, said identifying characteristics may include supplementary attributes of said user or entity.

Preferably, an entity becomes part of the network system by independent registration or by accepting an invitation from a registered entity, i.e. a user contact.

Entities agreeing to inclusion in a user's personal contacts network are said to be direct user contacts. According to one embodiment, entities included in the database system which are indirectly or unconnected to a user may become directly connected by mutual agreement, preferably by one entity sending an invitation and the other accepting. Potential users of such a system can be reassured that they will be included in a private network whereby only others with a common connection factor (e.g. friends, friends of friends, or friends of friends of friends and so forth) will be able to access their personal details if they choose to make them available.

The present invention enables information flow not only between immediate acquaintances, but also with the subsequent tiers of entity acquaintances, e.g. friends of friends, friends of friends of friends, and beyond to include even larger domains entities. The core principles and elements of the invention, namely the ability to transfer search and web-related information within a network whose members are directly or indirectly known to the user, giving an interrelationship context to any information transfer, may be applied a diverse range of applications without need to adapt the principles of operation.

As referred to herein, if two entities are linked through any number of intermediate entities they are said to be "connected". Furthermore, if two entities exist independently in the database system or a personal contacts network with no intermediate entities connecting them, they are said to be "disconnected".

In one embodiment, the said connection factor incorporates a connection path length between two entities, given by the minimum number of connections in a chain of entities separating two entities.

In a further embodiment, the said connection factor incorporates the degree of separation between two entities and is equal to the shortest connection path length of all the available connection paths between the entities, wherein an entity that is directly connected to another entity is said to be a direct contact giving a "1st degree contact," and has a connection path length of one; two entities connected via one intermediate entity are said to be "2nd degree contacts," and have a connection path length of two, and wherein any two entities whose shortest connection path is via "N-1" intermediate entities (if any), with a " . . . th" path length of "N" are an N degree contact, where "N" is an integer. Entities having a 2nd or higher degree contact are said to be indirect contacts, or indirectly connected.

According to one embodiment, the present invention is configured to allow a user to apply a selective input to the user's suggestions by using a filter criteria of controlling the value of Nth degrees contact of entities to be included, where N is a variable determined by the user.

In a further embodiment, the filter criteria for said selective input may be linked to a predetermined activity. Thus, if the user is interested in a particular event, or activity, they may tailor their user contacts to reflect particular aspects of the predetermined activity.

Alternatively, a user engaged in one or more said predetermined activities may specify the action to apply to
- all degrees of contact in the user's personal contacts network, at any connection path length, or
- the entire system network of all nodes, including those who are not connected to the user.

Preferably, said applications include (but are not limited to) consumer decisions, buying, selling, trading loaning; finding flatmates/roommates, tenants; organising activities and events, recommendations/opinions including those related to films, plays, books, employment, services, tradesmen, accommodation, restaurants and the like, comparison and explorations of common interests, e.g. horse riding, snowboarding, etc.; sharing peer-to-peer personal or business creative work or content, e.g. photos, art-work, literature, music; managing a club or society; locating/supplying/ "blacklisting" providers of goods or services; business or technological advice unsuitable for publication; recruitment, job-seeking; estate agents; venture capital; collaborative ventures; referrals; police/security information gathering/ informants; event manager; address book manager; headhunting; book mark service; spam filtering; car sharing; sales leads; market entry advice; real-estate; sharing personal or business files; company knowledge management; medical advice; travel organiser, lending/borrowing; house-sitting; baby-sitting; classified advertisements; finding musicians.

In addition, the present invention permits said selective input to be received from networks outside the system network.

It will be appreciated that there are numerous potential reasons for limiting the degrees of separation of entities used by the user for any selective input, said reasons including, but not limited to, social, economic, or political contexts such as trust, discretion, interest, association, preference, shared experience, ethnicity, religion, language, location, allegiance, alliance, treaty, politics, or governance.

It will be appreciated there are numerous methods of customising the selective input to the user's suggestions. In one embodiment, the suggestions are a weighted average of direct contacts and indirect contacts. In alternative embodiments, the selective input may be defined by the user.

The user contacts associated with the suggestions most frequently chosen by the user may be designated preferred user contacts. The designation of preferred user contact may be performed directly by the user, or calculated by the system by determining the user contact associated with the most popular suggestions previously selected by the user.

In yet further embodiments, the selective input may be at least partially weighted to suggestions from the preferred user contacts.

The search engine system effectively learns which user contact suggestions the user prefers. These may not necessarily be direct contacts of the user and may indirectly indicate a potential similarity in interests or tastes with that entity. The present invention thus provides a means (described more fully later) for contacting the entity to further pursue the potential common ground.

Alternatively, the selective input may be varied according to other known factors regarding the user contact including the interrelationship context information, the connection factor and/or entity attributes associated with the contributing user contact.

The user may for example balance the number (and degree of contact) of user contacts to provide the selective input for the suggestions against the variety and volume of the suggestions generated.

This present invention may readily be configured to specific items or issues people search for such as news, pictures, books, auctions, products, chat rooms, games, e-cards, investments, song downloads, etc.

People naturally tend to share an interest in the same news items as people in their social network (either personal contacts networks or organisations). The present invention provides a powerful means to sort news items according to the interests of the direct user contacts for example, (or to optionally extend that to 2nd degree, 3rd degree, or further contacts or organised networks) thus providing an effective filter for the thousands of available stories on any given day.

It will be appreciated that during the initial use of the search engine, there will not be any existing suggestions from user contacts. Instead, the same searches may be populated by results from searches from all the users of the search engine.

As previously discussed, in addition to providing suggestions to the user, the present invention provides weighted search results. This weighting may be provided in addition to, or instead of the existing mechanisms, namely:

Keyword frequency and meta tags;
Professional editors manually evaluating sites;
How much advertisers or web-sites are prepared to pay, and
Measuring which web-sites webmasters think are important. This is done by link analysis, which gives more weighting to sites dependant on what other sites are linked to them. The overall popularity, the popularity of a sub set of users (e.g. NZ people, engineers) or the user's own previous searches (as disclosed in U.S. Pat. No. 6,421,675)

The present invention determines the relevance of the search results according to the preferences of the user's unique private personal contacts network of contacts as discussed above. In a similar manner to the means of generating the suggestions, the search results associated with a keyword may be weighted according to a selective input from the user contacts, including filter criteria related to the interrelationship context information, the connection factor and/or entity attributes associated with the contributing user contact.

Thus for example, the user may give a stronger weighting for 1st degree contacts compared to 2nd degree contacts. Using the example of a search under the keyword terms "holiday destinations", the user could learn their network of contacts shows a preference for skiing in the France during the winter and for the Greek islands during summer. However, a different user may have seen different results even if they live in the same location, and even had the same occupations, as their personal contacts network of contacts would inevitably be different, with consequently different holiday preferences.

The search results may be further refined by specifying the selective input filter criteria to include various entity attributes relevant to the search such as a particular occupation, sporting interest or the like. Conversely, if a particular set of filter criteria closely match an entity disconnected from the user, the system may prompt the user to prompt the entity to be connected to the user.

Equally, the system may prompt the user for communication (e.g. e-mail, Instant messenger, phone etc.) with a user contact who last performed the search, or recommended a particular web-site/search result. This communication may be via a link (e-mail or we link) adjacent to the keyword search terms and/or web-sites and could be configured to be either anonymous communication or not.

In one configuration for example, the user contact is not initially identified to the user, though the user is identified in the e-mail via some form of interrelationship context information such as the connection factor/entity attribute e.g. your direct contact Rick knows Sue (your 2nd degree contact who knows the sender directly. The user contact may respond anonymously (via a web-site) or reply to the e-mail including their direct e-mail address.

Self-evidently, most web-sites seek to maximise the number of users visiting their site. The present invention provides a means for web-sites to receive more web traffic by promoting the search engine to their customers.

According to one embodiment, a participating partner web-site (e.g. a commercial retail web-site) is given a unique link (a URL, a 'clickable' graphic or search box) to the search engine, configured such that users clicking on the search engine link are linked to a search page with the participating web-site listed as the top of the popular searches and/or recent web-sites suggestions listing.

Any user accessing the search engine via this route who then invites their user contacts to also use the search engine service will also see that participating partner web-site listed and may visit the site. Thus, the partner web-site may use the present invention as a means of marketing themselves to the connected entities of their existing customers.

It is also a means to increase utilisation of the present invention by providing web-sites with an incentive to include a link to the search engine without any direct drawback. Further web-sites may be enticed to become partner web-sites and include a link to the search engine if webmasters of web-sites already using the search engine invite webmasters of other web-sites to use the search service whereby in return both web-sites are listed under the appropriate suggestions. Thus, each participating web-site has an incentive to get other web-sites to use the search service as it will generate more traffic for their own site.

According to a further aspect of the present invention, the search service may also be configured to conduct searches solely of material on the partner web-site instead of, or as well as 'all internet' searches. The partner web-site may also display a list of suggestions either based on the generic search activities of all users, or for users having their own private personal contacts network, customised to reflect the suggestions associated by the activities of their user contacts on the participating web-site. On appropriate commercial web-sites, a recommendation to related products to the one being searched for which were bought, viewed, subscribed to and so forth may be made by previous user contacts to the site.

The product or other search recommendations may not necessarily be restricted to a single web-site, whereby the user may view relevant searches previously accessed by their user contacts across a number of (partner and non-partner) sites, thus increasing the web-activity on all the web-sites involved.

For example on the 'all internet search', recommendations may direct users to do a search on a partner web-site. This will enhance traffic to the partner web-site. Similarly, on a partner web-site, recommendations may direct users to do a search on the 'all internet search' or to another partner web-site.

A further aspect of the present invention is the method for a partner web-site or broker to act as an intermediary between advertisers (or representatives of advertisers) and sites which feature the search engine and suggestions relevant to the advertiser product(s), service(s), website(s), or company(ies).

In one embodiment, a partner web-site would offer a service directly to advertisers or representatives of advertisers. They could offer the advertiser two variations of advertising to the users of the partner web-site. In one variation, the advertiser suggestion(s) would be made available and seeded to all the users of the partner web-site or a subset of them, and word of mouth amongst those users and their contacts would help spread the visibility of the suggestion(s), possibly in the form of recommendations. In another variation, the advertiser suggestion(s) would be seeded to those partner web-site users who had previously shown interest or propensity to click on similar suggestion(s).

In another embodiment, the owner of the present invention could provide the broker service as an intermediary between advertisers and partner web-sites.

Then the partner web-sites would not be involved in the selection of advertisers and suggestions but would simply make their user base available for the seeding of suggestions and distribution of recommendations.

In a third embodiment, the owner of the present invention could present it to firms currently working as brokers or providing web search advertising directly, in which they sell sponsored search results to advertisers at fixed-price or auction, while guaranteeing the advertiser a certain position in the results presented to a user who performs a search on the keyword purchased by the advertiser. These firms would then be able to offer an additional service, in which advertisers bid for or buy the right to be included in suggestions to partner site users and individual users or networks of users who have indicated an interest in or shown a propensity to click on similar suggestions or recommendations Instead of using a full Internet web-browser window to access the search engine, the user may download a toolbar that remains resident through all the user's web-browser usage. Such downloadable toolbars are known, however, the technology may be enhanced by incorporation of the present invention. Firstly, in known manner, the toolbar permits searches to be performed directly from the user's web-browser without need to access a separate search engine web-site. Secondly, the tool bar could also monitor the web-sites accessed by the user directly without conducting a keyword search as part of the determination of the suggestions data and search weightings.

The tool bar may also display or provide access to the most recent suggestions data from the user contacts.

The monitoring ability of the toolbar enables the system (with the user's permission) to track the user's web-surfing activities to all web-sites.

Consequently, upon accessing a particular web-site, the user may be optionally notified by the toolbar of their user contacts who visited that site, and what a subsequent sites the user contact accessed.

As an example;
1) A User is informed by a user contact X of a web-site Y related to holiday homes in New Zealand.
2) The user accesses site Y and is notified on the toolbar that (optionally) user contact X accessed this site, or (if the user contact's identity is withheld) notified that when some of their user contacts from their network accessed site Y, they also visited site Z. User contact X may optionally have made a recommendation regarding either site Y or Z, which is also notified to the user via the toolbar.
3) The web-site Y and or Z can pay for the privilege of being at the top of this notification list.

According to a further embodiment, the search engine may also be configured to provide the user with notifications of further specified occurrences, including access of a specified (or book-marked) web-site by a user contact and/or an associated recommendation to same, or further sites accessed after the book-marked site, or of any new material at, or links to, the specified site.

It will be appreciated that all the above-described features associated with the toolbar may also be performed by the full search engine.

As the weighted search results and suggestions are correlated to social networks and to the entity's individual identity, an enhancement of the recommendations feature it is possible to allow individual users to make comments in an appraisal regarding web-sites accessed via the search engine.

In a further embodiment, the search engine includes means for linking an appraisal with a search result and/or suggestion. Preferably said appraisal may include a recommendation (optionally graded) and/or user comments.

In one embodiment, said appraisals are performed via links associated with individual results on search results listing. Alternatively, the appraisals may be performed whilst accessing the search result or suggestion web-site via a link to the search engine. Thus, users could be invited to "comment on current site" which may typically involve identifying sites as particularly useful, useless, curious, or to be avoided and so forth.

The user comments may be in the form of unrestricted typed comments and/or selected from a predetermined list of appraisal gradings. Such predetermined gradings may be used to provide further filter criteria for suggestions or weighted search results, e.g. only show suggestions for web-sites given a good or interesting appraisal grading, or alternatively, ignore "useless" appraisal gradings from user contact X.

The appraisals are only visible to user contacts within the personal or organised networks to which the commentator belongs. Optionally, the commentator could include their identity or a means to contact them via the search service. A user inputting user comments on a healthcare site may state, "This really worked well for me, but there are some things to watch out for. Get in touch if you'd like to discuss. Click to contact."

It is noteworthy that by comparison, a comparable system that allows unrestricted public annotations to web-sites and search results would not be trustworthy or useful because there is no confidence in the identity or character of the annotator. As an example, an annotation that a particular product or service is a "good" or "bad" one would lack credibility without any assurance that the annotator does not work for the company or for a competitor.

The feature of adding recommendations or appraisals may be readily extended to relate to issues not directly related to the web-site itself, as these comments will only be accessible to the user contacts in the user's personal contacts network. An infinite range of comments are possible, e.g. "A great book; borrow mine if you like", "This album rocks. Don't listen to it after 10 pm or you'll be dancing on your bed", "Nice car but spare parts take months to find in NZ", "John O'Neill can eat all those tickets in a salad for all I care", "Careful, this is a scam" and so forth.

The feature of user recommendations may also be used as a factor in weighting the search results. As previously discussed, prior art search engines allow users to submit web-sites they consider should be included in the results for a given keywords. However, this system can be open to abuse by webmasters trying to obtain higher rankings for their web-sites.

In contrast, the present invention allows users to make recommendations (positive or negative) for web-sites that would cause their ranking to alter in a list of sites for particular keyword searches or suggestions for their network of contacts. The search engine system incorporates feedback on the efficacy of the recommendations by the reaction of the user contacts. If the user's contacts concurred with the recommendations by active or automatically calculated affirmations (either by active voting or passively by clicking on the recommended web-site), the recommendation could be propagated through the entities in the social network.

A key advantage of the present invention over prior art systems of submissions to a search engine Webmaster is the discouragement for low quality submissions. Firstly they would have little effect other than degrading the search for the user's own personal contacts network of user contacts. Secondly, there is little incentive if the user responsible for repeatedly submitting low quality, misleading or otherwise dubious recommendations is identifiable to their user contacts. According to a further aspect of the present invention, users are accorded a predetermined number of recommendations according to a predetermined user recommendation credibility criteria. In one embodiment, said recommendation credibility may be determined by active or automatic affirmations of said user recommendations by the user contacts. Alternative recommendation credibility criteria may include a fixed quota of recommendation over a specified time period, or linked to particular entity attributes for recommendations for web-sites associated with said entity attributes.

Thus, the recommendation credibility criteria may be determined according to a number of factors including (but not limited to):

- users who prove to their user contacts to submit germane recommendations may 'earn' the ability to make additional recommendations;
- each user may be give a fixed quota over a given time period, e.g. 10 recommendations per month;
- a user with an entity attribute particularly relevant to a particular search topic, e.g. a consultant paediatrician would be eligible for more recommendations for results associated with keyword searches such as "childhood illnesses" and the like;
- the size and quality of the user's personal social network, e.g. if they are linked to a lot of users that also have a high credibility.

A further and potentially very significant advantage is returning a sense of control over the search results to the users according to their own personal experiences and opinions of the web-sites. It is a common complaint of prior art search engines that the results for particular keywords appear illogical or distorted and that new or emerging web-sites or those without significant financial/lobbying resources fail to achieve worthwhile rankings. The present invention replaces the search engine's external control over the search results and empowers the users to provide meaningful rankings. For example, a user having a personal web-site can maintain the site as the top ranked result for the user and the user contacts for certain keywords, e.g. the user's name. The same keyword search by a different entity in a different social network could give a different search result—though this would be more relevant to them.

The present invention can also be used to create a list of searches (both within and outside the user's private network of contacts) that have unsatisfactory or no search results. Some conscientious users may undertake to locate relevant search results to overcome deficiencies for particular keywords to help their user contacts and these results can be stored and reused. Consequently, the search results continuously improve over time. Users who provide such submissions could increase their recommendation credibility to increase how many recommendations they are permitted and optionally how far the sites are propagated. The recommendation credibility for a user could also be linked to their number of user contacts, and/or the number of times people have clicked on suggestion submissions etc.

A further search engine service of the present invention provides an e-mail to users when another user contact has found some pertinent results for a previous search term used by the user.

Often, individuals within a company or an organised network (e.g. professional association, or club) will perform similar searches. This searching work is likely to be useful to others in the same organised network. For example someone in an engineering company searching for data on a particular material may find a particularly relevant research report. The search engine can store these search terms and results and accord them a higher ranking for other users from the company or organised network performing the same search. This type of 'in-house' search activity may be used to create a corresponding list of suggestions specific to the members of the organised network/company.

As per the private network searches, the search engine system can be configured to include a contact link adjacent the search results and search terms to permit contact with others in the company to discuss search results of relevance. The contact may again be anonymous or not.

In comparison to a conscientious user in a private network addressing deficiencies in a result for a particular search, a commercial company or organisation may task an individual with such a task to ensure homogeneity and reliability for in-house data resources.

A peripheral benefit for companies/organised in sharing results via the present invention is that it doesn't add an additional burden on the amount of work already being undertaken by the network members and in many instances will reduce unnecessary duplication of effort. The search engine may also be integrated into any existing Intranet search within the organised network.

Numerous refinements may also be incorporated in to the present invention according to the particular requirements of the users.

A fundamental requirement for ensuring the search engine users engage in meaningful information sharing via the suggestions and search results weighting is to provide the users with the power to discriminate what web-activities contribute, or are discernable to user contacts in their private network. A user searching for new employment or concerned about a potential serious illness affecting their spouse for example may not want any of the details to be visible to their user contacts.

Thus, according to a further aspect of the present invention, the user may optionally select web or search activity for exclusion from contributing to said indicative information.

There are many possible configurations by which this feature may be implemented, e.g. having two search buttons labelled "private network search" and "Don't share this search" or "private search". This enables users to still conduct searches without being recorded for their user contacts to share. Alternatively, a simple "private search" check box may be used.

In a further embodiment, partner web-sites may use their own branded versions of the search engine. Thus, instead of just having their URL link at the top of the popular/recent web-sites suggestions list, the link could be customised to show the search engine with the partner web-site's brand/banner/logo at the top of the page together with use of their colours/fonts, layout etc.

According to a yet further aspect, the present invention provides the ability for a user to delete searches or web-activity from incorporation in said indicative information. This may be used to remove information inadvertently included, or to information which appears to the user with hindsight to be unhelpful, misleading or similar. In a further embodiment, each user is provided with an editable history log of every search they have performed and each web-site visited. The user may edit their history log and remove any search they did from the list of searches that are shared with their contacts, though deletion of searches initiated by the user contacts may not be edited.

In a commercial organisation or organised network, the search engine may be configured to disable any editing of the user's history log and or preventing any search or web-activity from being included in the indicative information complied by the search invention and discernable to the user contacts. This peer-awareness of the web-activities of the organisation's members may be used to ensure any inappropriate or unauthorised misuse of internet access may be effectively policed through social feedback, irrespective of any overt disciplinary measures available.

Prior art search engines prompt users of additional searches that were also performed by previous searchers performing the same keyword search, in an analogous manner, the present invention may provide the similar prompts though with the additional feature than the user may be notified of the previous user contacts that also performed the same keyword search.

In a further embodiment, users can submit recommendations for sites limited to specific keywords. A user may for example be recommending a specific site, though only when their company name is one of the keywords used. If the subsequent evaluation of the site by the user contacts is positive, with possible positive appraisal/recommendations, the web site may enhance its ranking in networks outside the user's personal contacts network.

Although a user may have a number of directly connected user contacts for example, each may have particular strengths or weaknesses with regard to different searches the user may wish to undertake. Thus, the weighting of individual user contacts may be passively/automatically or actively adjusted based on various criteria such as usefulness of their browsing, reliability of results, their personal tastes, any entity attribute known to the system.

As examples, it may be known that user contact A has a passionate aversion to a particular software multinational and thus their recommended or accessed web-sites related to software may reflect this bias, and thus the user de-weights any input from user contact A for software searches. User contact B may produce excellent recommendations or searches during working hours but only accesses gaming web-sites out of work hours. The indicative information input from user contact B may thus be de-weighted outside a certain time period.

In a further embodiment, a user may make use of a more active approach to alerting their user contacts to discovering particularly notable web-sites, rather than the more passive inclusion of the site on the search engine suggestions entries in the conventional manner. This may be achieved in a variety of ways, such as altering the appearance of the site in the suggestions listing e.g. being bolded, different coloured, appearing in a separate list and/or being e-mailed directly to the user contact. The suggestions listings themselves may also be distributed to other user contacts and even to unconnected entities via e-mail or phone message texts.

The present invention could also be used as a replacement mechanism for the widespread e-mailing of jokes and the like between friends and workmates.

Essentially, web-sites accessed by the user and rated accordingly are replaced by e-mails (optionally with attachments) containing the material to be distributed to all the user contacts. Optionally, distribution may be filtered according to its rating by the user and subsequently by the user contacts, the various entity attributes of the user contacts or the degree of contact with the entity. Using the present invention in this manner ensures no one is e-mailed the same material twice and potentially offensive material is not sent to the wrong user contact. It will be appreciated that the material need not be jokes, but may instead be any form of information, including text, images, and audio recordings. The system may be configured such that such e-mails may be forwarded to a specific link associated with the search engine and the subsequent distribution is handled automatically.

In a further embodiment, the present invention incorporates a book-marking system, whereby a user accessing a notable web-site may use a book-marking feature on the search engine web-site or toolbar to add the bookmarked web-site to a compilation list of other bookmarked sites deemed to be of sufficient interest to the user that they are permanently retained on the list so as to be continually accessible and available.

The present invention may also be used to aid blogging communities to create trusted search tools for blog content.

According to a further aspect of the present invention there is provided a search engine system capable of displaying indicative information to a user from searches performed by entities (or as 'user contacts') connected directly or indirectly with the user, wherein said system includes;

at least one host computer processor connectable to one or more network(s),
a database accessible over said network(s),
a plurality of data input devices connectable to said network(s),
a search engine accessible over said network(s),
wherein said system is capable of forming said private personal contacts network for each of one or more users by
receiving input from the said user including at least one identifying characteristic of the user and of one or more chosen entities known to said user,
recording said identifying characteristic of each entity including the user to form one or more corresponding entity data records in said database,
notifying the or each chosen entity of their recordal on said system and requesting input of at least one identifying characteristic of one or more further entities known to the or each said chosen entity,
recording the identifying characteristic of each further entity inputted by the or each said chosen entity to form further corresponding entity data records,
repeating the above steps of successive notification of further entities and
recordal of the identifying characteristic of each further entity chosen as further entity data records,
providing searchable access to at least part of the entity data records stored in said database and to the internet.

Searchable access to an entity data record may be restricted by the entity to said user contacts.

Preferably, said data input devices are computer terminals, PDAs, telephones, mobile phones, laptops, notebooks, any other portable personal computing device connectable to said network, preferably but not limited to the internet.

Said data input devices may provide webpage, e-mail, text message, DTMF tone, voice or video access to the said host computer or between entities and/or web-browsing access to said host computer via a dedicated web-site interface.

The additional data obtained from the entity's identifying characteristics may be used to provide users with the means of obtaining information related to specific search applications from within their own unique extended private personal contacts network of contacts.

According to a further aspect of the present invention there is provided a method of creating a private personal contacts network for interaction with a search engine system as described above, said method including the steps performed by a processor of a data processing and storage system, of:

receiving input from the said user including at least one identifying characteristic of the user and at least one chosen entity known to said user and hereinafter referred to as a user contact;
recording said identifying characteristic of each user contact including the user to form at least one corresponding user contact data record in said database;
notifying the or each user contact of their recordal on said system and requesting input of at least one identifying characteristic of at least one further entity known to the user contact;
recording the identifying characteristic of each further entity inputted by the or each user contact to form further corresponding user contact data records;
repeating the above steps of successive notification of further entities and
recordal of the identifying characteristic of each further entity chosen as further user contact data records;
providing searchable access to at least part of the user contact data records stored in said database.

It can thus be seen that the present invention provides a means of combining and enhancing the attributes of the earlier search engine and private network systems disclosed in U.S. Pat. No. 6,421,675 and PCT application PCT/NZ02/00199 together with the addition of a powerful set of new inventive features to provide a customisable search engine, with social feedback.

BRIEF DESCRIPTION OF DRAWINGS

Further aspects of the present invention will become apparent from the following description which is given by way of example only and with reference to the accompanying drawings in which:

FIG. 4. shows a login screen of the present invention;

FIG. 5. shows a membership invitation form for the present invention, and

BEST MODES FOR CARRYING OUT THE INVENTION

The present invention relates generally to a means of harnessing the discriminatory powers of the knowledge, opinions and recommendations of an entity's extened network of contacts in an efficient and systematic manner to provide an effective means of searching the internet (or other databases) with social feedback from the user's personal contacts network. There are numerous potential applications for the present invention of which the examples described in more detail below are by way of illustration only.

FIGS. 1-5 show a preferred embodiment of the present invention in the form of an Internet search engine (1) capable of conventional "all internet" searches or optionally, being customised to display indicative information from entities connected directly or indirectly with the user (2). Any such entity connected to the user (2) in this manner is referred to as a user contact. In the embodiment shown, all the entities comprising the user contacts are individuals, though it will be appreciated that an entity may also be any individual, family, personal or organised network, organisation, club, society, company, partnership, religion, or entity that exists as a particular and discreet unit. The operation of the search engine (1) in the performance of standard, uncustomised "all internet" searches is well known to those in the art and is not discussed further herein.

Figure 1:
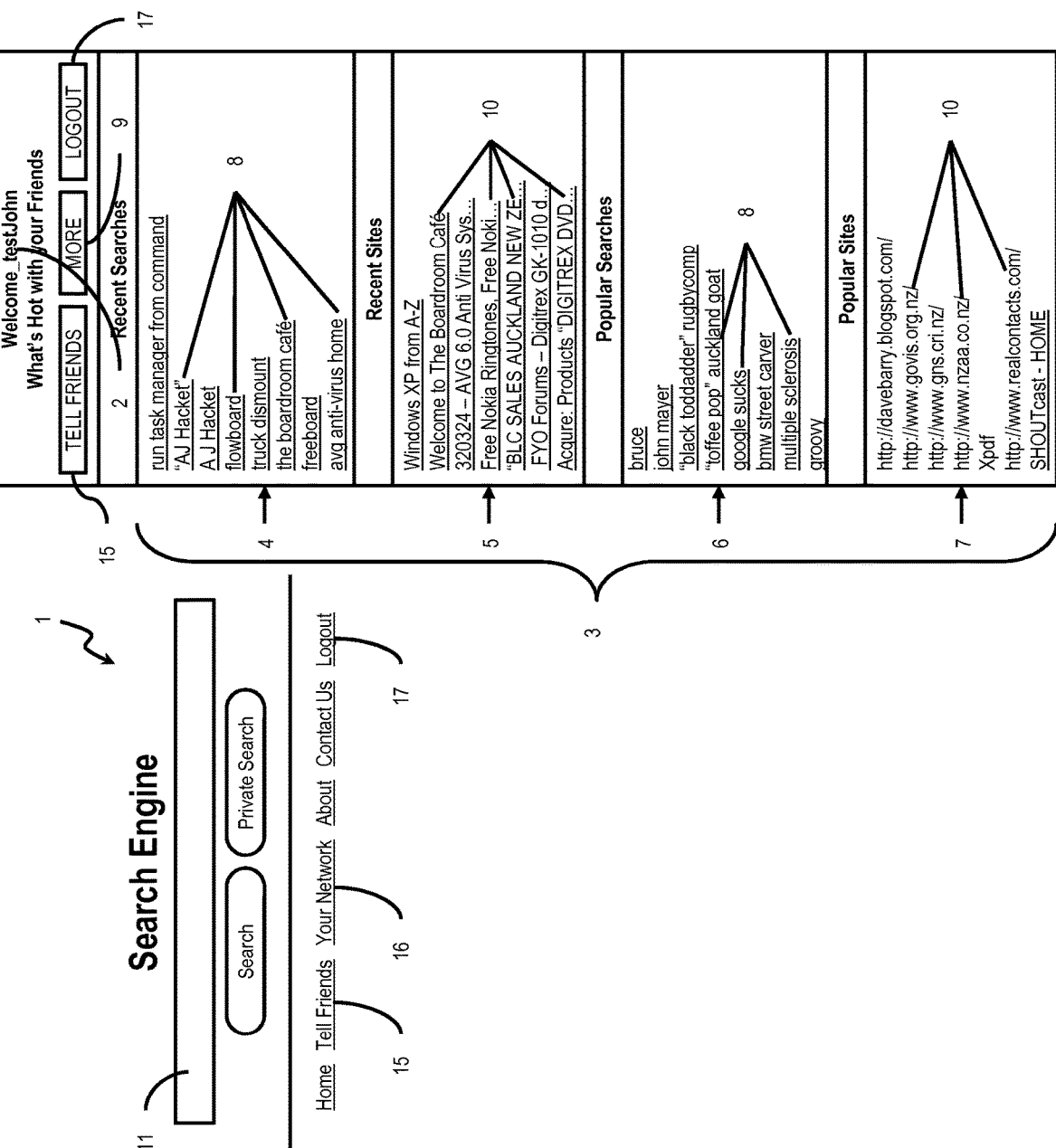
FIG. 1. shows a preferred embodiment of the present invention in the form of a home web-page of an internet search engine.
Figure 2:
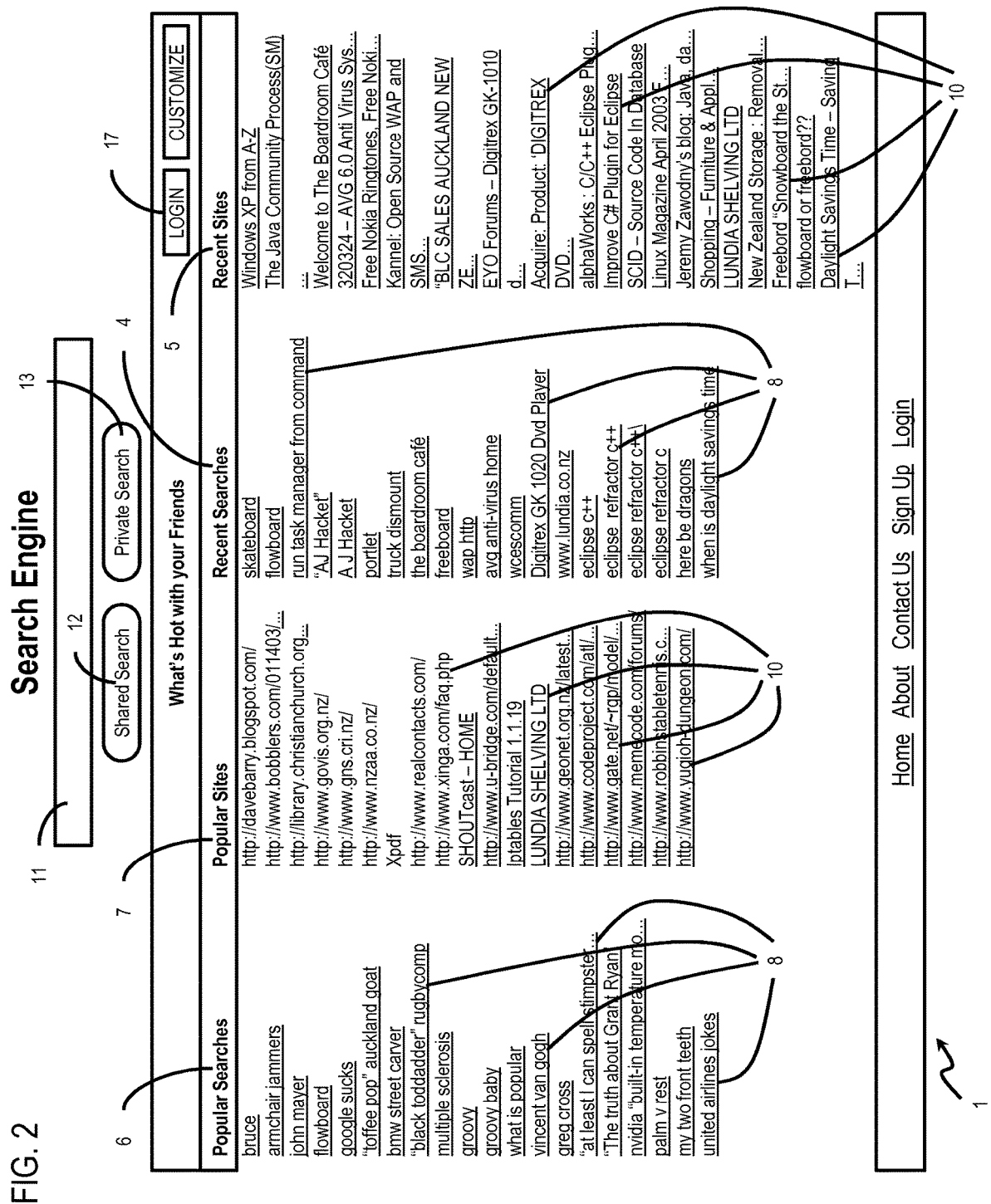
FIG. 2. shows an extension of the suggestion fields shown in FIG. 1.

In a departure from prior art search engines, the present invention search engine (1) includes a plurality of suggestions (3). FIG. 1 shows an embodiment with four types of suggestions (3), consisting of recent searches (4), recent sites (5), popular searches (6) and popular sites (7). Each of these suggestions (3) displays indicative information from the user contacts. It will be appreciated that numerous alternative suggestions may be used without departing from the scope of the invention.

While the present invention (1) may use any user (2) to supply the indicative information for the suggestions (3), in the preferred embodiment shown, this information is derived from the user contacts with whom the user (2) has some existing relationship, and are members of a private network (not shown), associated with the user (2). The private network (as more fully described in the co-pending application by the same applicant, PCT/NZ02/00199) enables the user (2) to characterise the relationship between themselves and their personal user contacts and to filter/manage interaction with the user contacts according to the interrelationship context information defining the relationship. In a preferred embodiment, the interrelationship context information includes a connection factor and one or more entity attributes. The connection factor provides a measure of the degree of separation between the user (2) and the user contact, i.e. user contacts known directly to the user (2) may be termed "direct contacts" whilst user contacts known to the user (2) via one or more intermediary user contacts are known as "indirect contacts". Any 2 entities having no intermediate contacts said to be "disconnected". Therefore, it can be seen that direct contacts can be termed a 1st order contact whilst their own direct contacts will become $2^{nd}$ order contacts to the user (2) (unless they are also direct contacts of the user (2) as well) and so forth.

The suggestions (3) showed in FIG. 1 represent the web-related activities of the user contacts. The particular user contacts providing data for the suggestions (3) may be filtered or weighted according to the individual connection factor with the user (2). The system also records at least one entity attribute (not shown) for each of the user contacts as part of the interrelationship context information, and this may include a variety of personal details, information regarding personal details, factors or interests; friends; relations; school alumni; employment factors; business colleagues; professional acquaintances; sexual preferences, persuasions, or proclivities; sporting interests; entertainment, artistic, creative or leisure interests; travel interests, commercial, religious, political, theological or ideological belief or opinions; academic, scientific, or engineering disciplines; humanitarian, social, security/military or economic fields and any combination of same.

The entity attributes may also form part of the eligibility criteria for the user contact to contribute to the suggestions (3). Regarding the individual suggestions (3), the recent searches (4) denote the most recent keywords (8) used by the user contacts. The search engine (1) may be configured so that the searches by the user (2) are also shown in the recent searches (4) window, giving a real-time indication to the user (2) of the rate of new searches appearing in the recent searches (4) window. An expanded listing (including previous entries) of suggestions (3) may be accessed by a link (9) which leads to the search engine (1) web-page shown in FIG. 2.

Figure 3:
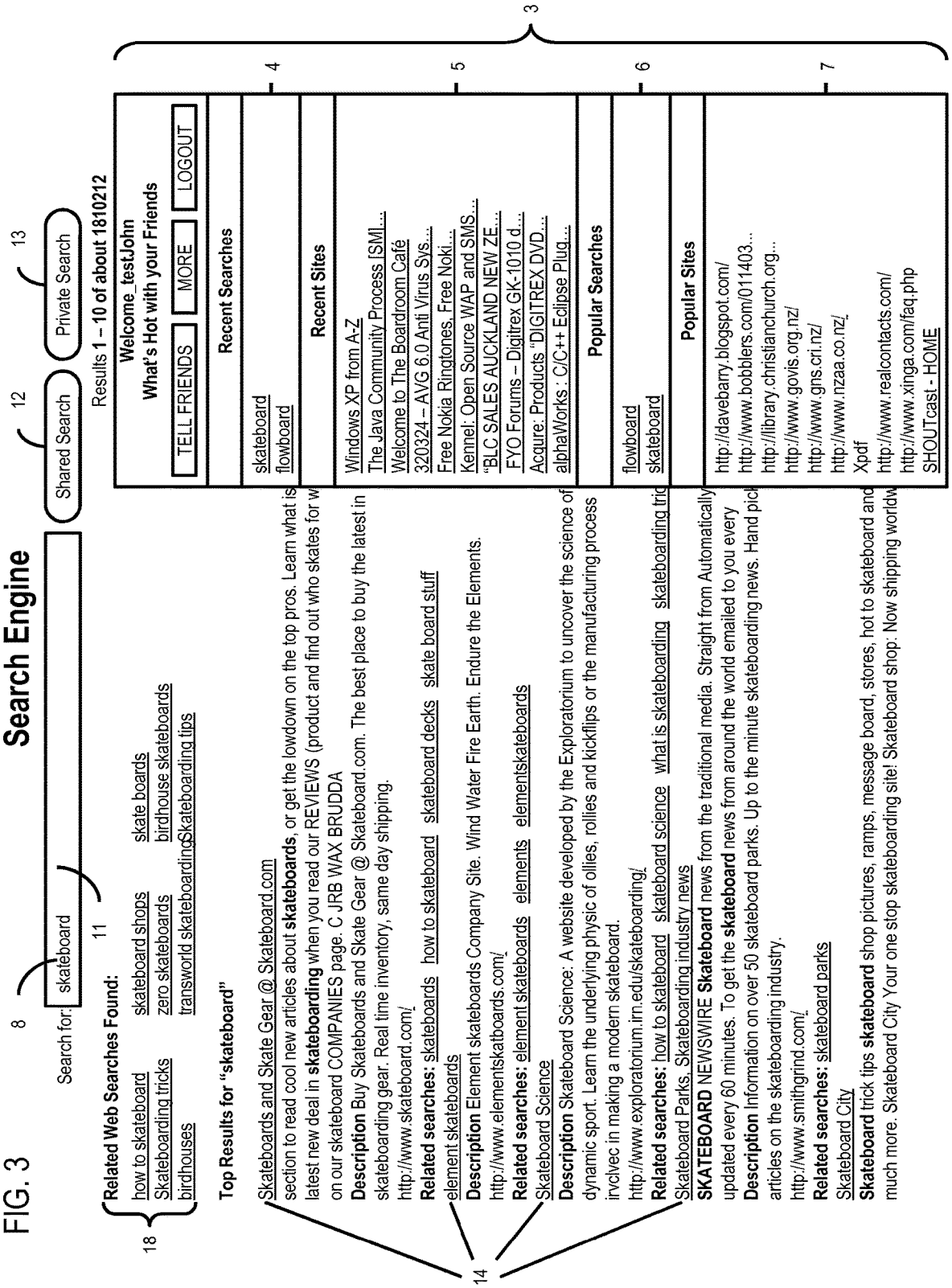
FIG. 3. shows a web-page listing of search results obtained using the present invention of a search engine.

The popular searches (6) show a ranking of the most popular keywords (8) used by the user contacts, whilst the popular web-sites (7) show a ranked list of web sites (10) most regularly visited and/or recommended by the user contacts. The home web-page of the search engine (1) as shown in FIG. 1, also includes the keyword entry field (11) and 2 alternative settings to record each search as either "a shared search (12)", or "a private search (13)". Clicking on the "shared search link" (12) configures the search engine to record the keywords (8) inputted by the user (2) for inclusion in the recent searches (4) and also the listing of web-sites resulting from the search, and any sites accessed thereafter by the user (2) for inclusion in the recent sites (5) listing. FIG. 3 shows the resulting search results (14) for the keyword (8) "skateboard". It can also be seen that in the recent searches (4) field the term "skateboard" is the most recent keyword (8). In contrast, the popular searches (6) shows the "skateboard" as the second most popular search keyword (8), indicating that despite its recent use, the term "flowboard" has been used more frequently as a keyword (8). If the user (2) clicks the private search link (13), none of the user's (2) activities would be recorded by the system (1).

The initial search engine (1) web-page shown in FIG. 1 also includes links (9) to invite entities to join the user's (2) network and links (9) to configure/see the user's (2) network (15, 16 respectively). A further link (17) provides the login/logout feature of incorporating the user's (2) personal contacts network to interact with the search engine (1).

It can also be seen in FIG. 3 that the search for a keyword (8) skateboard has also yielded a listing of "related web searches found" (18). These related web searches (18) show searches also performed by the user contacts in conjunction with searches for the keyword (8) skateboard.

In contrast to prior art search engines, the suggestions (3) have far greater significance to the user (2) as the opinions of the user contacts are far more likely to be of greater significance and given more credibility by the user (2) than suggestions (3) emanating from data collected from any ordinary user of the search engine (1). As previously referred to, the user contacts contributing to the suggestions (3) may be unrestricted, i.e. all contacts contribute equally, or configurable by the user (2) to give a preference or weighting to specific user contacts. This may be based on a variety of factors including the connection factor, (e.g. choosing direct contacts to provide twice the number of suggestions (3) than 2nd degree contacts), and/or relating to an entity attribute, e.g. the search for the keyword (8) skateboard may be supplemented by filtering the user contacts for the suggestions (3) according to an entity attribute of "an interest in skateboarding".

A user (2) may find particular user contacts provide interesting selections and/or relevant web-sites and consequently may be given a higher weighting by placing their suggestions (3) higher up the listings and/or providing a greater number of inputs. In a further aspect of the preferred embodiment, the user contacts and the user (2) are provided with a number of recommendations (not shown). These may be used to increase the ranking of particular web-sites for keyword (8) searches (optionally, recommendations may be tied to particular keywords (8)) and/or may be used to promote sites in the popular sites (7) field.

The number of recommendations given to each user contact may be fixed or varied according to several eligibility criteria. These may include positive feedback from other user contacts (either by active recommendations or by automatic/passive affirmations resulting from user contacts accessing the recommended web-sites submitted). Alternatively, they may be re-issued after a given time period. User contacts with particular entity attributes associated with specific keywords (8), may also be given additional recommendations, e.g. a computer software reviewer may be given supplementary recommendations to appear in the related web search field (18) and/or associated with particular searches and specific software-related keywords (8).

The present invention also provides a means of contacting the user contacts responsible for particular keywords (8) or suggestions (3) and/or those having accessed a particular web-site irrespective of whether it appears in the suggestions (3) field. This contact may be anonymously or, via an intermediary web-site or anonymous e-mail or alternatively, the users (2) may agree to their identity being shown by the system (1).

The ability of the present invention to apply selective input and filtering from the activities of the user contacts is also of interest for further web searching and/or information gathering by the user (2) and also reduces potential time wasted on unproductive searches and helps to more rapidly find relevant results.

The indicative information provided by the user contacts will also be used to weight search results (14) associated with a particular keyword (8). The search weighting may be performed by active recommendations from individual user contacts, thereby promoting particular web-sites or by passive/automatic feedback, as described in the earlier U.S. Pat. No. 6,421,675 (and associated applications). U.S. Pat. No. 6,421,675 discloses a powerful means of weighting search results according to the behaviour of the user's accessing results listing. According to those criteria, a site may be deemed more useful if a user accesses the link and either remains on the site for a predetermined time and/or performs other actions indicating the site has relevance, i.e. downloading material, following related links, reading additional pages or subscribing to material at the site. Conversely, if a web-site is accessed and immediately exited, this implies the site was of little relevance for the search keyword. These techniques may also be incorporated in the present invention in addition to the refinement of giving increased weighting according to which entities performed the search, i.e. the user contacts. Thus, the selections and associated searches performed by a direct contact may be considered of greater significance than an indirect contact and/or the behaviour of an unconnected entity and used to weight the results accordingly.

In a further embodiment, the features of the search engine (1), and in particular the suggestions (3) may be combined into a minimised toolbar which forms part of a stay-resident program running in conjunction with the user's (2) web-browser (not shown). The toolbar may also monitor the web-sites visited by the user (2) and in turn suggest additional web-sites that have previously been accessed by other user contacts who have also visited the same site and/or performed the same searches leading to that site.

In a further embodiment (not shown), the search engine (1) may be customised to be the search engine for a particular web-site and have the option of restricting the search to the material on the host web-site. A corresponding list of suggestions (3), may thus be created relating to the activity of the user's (2) user contacts who have visited the web-site. The suggestions (3) may be expanded to include lists of products either accessed and/or recommended by the user contacts.

The present invention may also be used with organised networks such as companies, institutes, or any other network whereby all the members have at least one common entity attribute and connection factor, i.e. they are all members of an organisation and are direct contacts respectively. The present invention provides the capability of treating such organised networks as either a single entity, with its own collective entity attributes, or as a collection of individual user contacts, each having the organised network as a common entity attribute. Numerous refinements are possible with the present invention such as the ability for the users (2) to actively mark web-sites of particular merit by ensuring their appearance in the suggestions (3) is suitably distinct (e.g. in a different font, or bold, or the like) and/or by sending an e-mail to chosen user contacts alerting to the web-site. It will be seen that before the user (2) has any user contacts registered for use with the system and able to impact on the web activities and searches of the user (2), it will be necessary to populate the suggestions (3) fields from non-user contact entities. Even when sufficient user contacts are available, such disconnected entities may still be used to contribute to the suggestions (3) if so desired by the user (2).

Nevertheless, the paramount aspects of the benefits of the present invention relate to the incorporation of the personal private network for the user (2). In order to access this feature of the search engine (1), the user (2) uses the login/logout link (17) which leads to the web-page (21) shown in FIG. 4. Existing users (2) enter their e-mail and password (19) whilst new users deciding to sign up to the network submit their first and last name, preferred e-mail address, location and new password via corresponding input fields (20). Upon joining the search engine (1) registered members, the user (2) may then invite his or her acquaintances to become members, i.e. their user contacts. Alternatively, the user (2) who themselves have been invited to join the system by an existing member. FIG. 5 shows a web-page form (22) for inviting entities currently unconnected to the user's (2) network to join.

Figure 6:
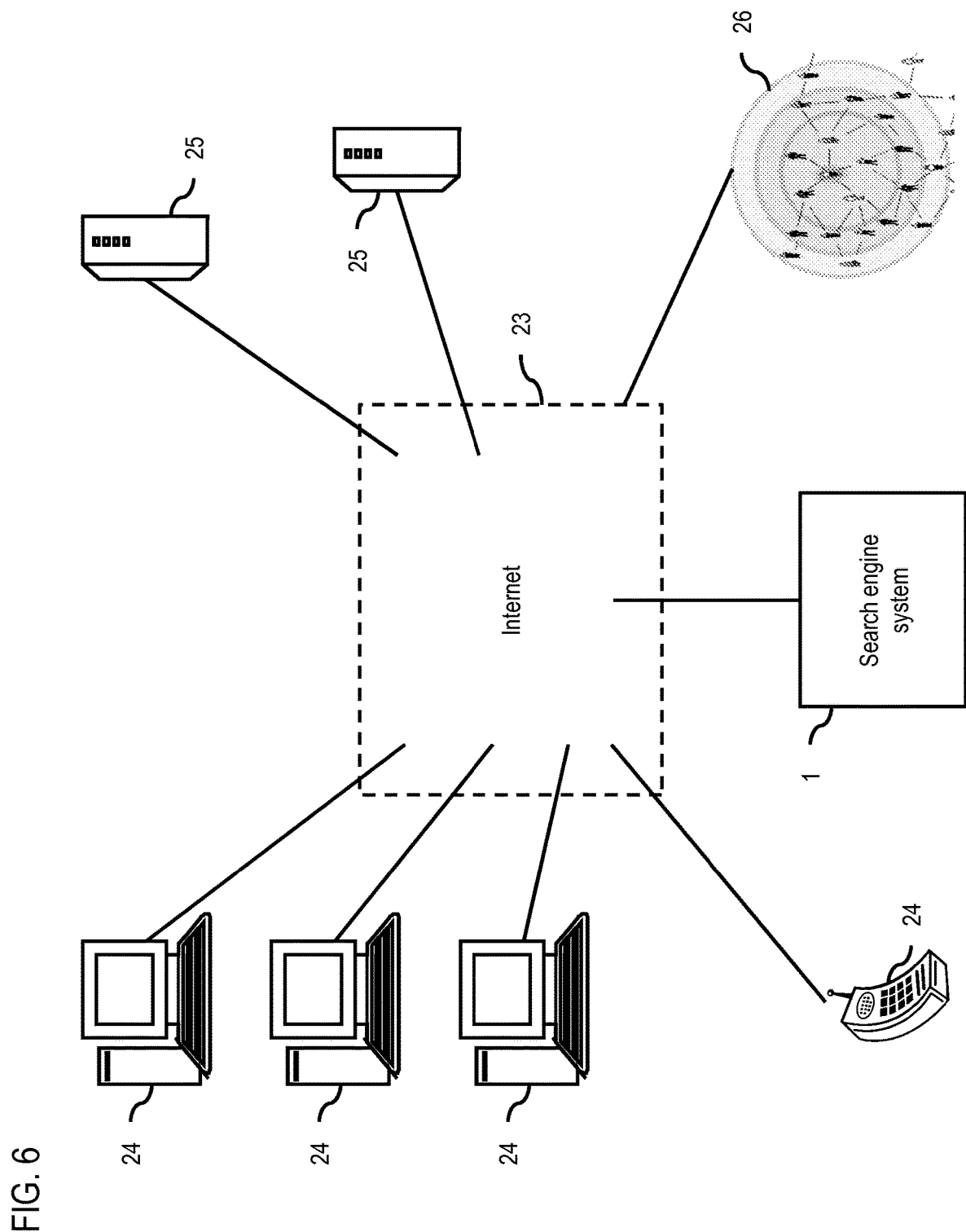
FIG. 6. is a schematic representation of a preferred embodiment of the present invention.

It will be appreciated that the present invention may be implemented in numerous physical configurations. Although the present invention may be implemented in any suitable environment with a searchable database on a network, the preferred embodiment as shown in FIG. 6 is described with respect to use on the internet (23) in which a plurality of users (not shown) may access the search engine (1) through the internet (23) via a plurality of user sites (24) such as personal computers, laptops, mobile phones, PDAs or the like.

It will be appreciated that FIG. 1 is symbolic only and that the internet (2) is actually composed of a multitude of user sites (24) and that searchable data may be obtained from a plurality of data sources (25). It will be appreciated that the data sources (25) may represent numerous data sources including one or more personal contact networks (26) individually associated with one or more users. Moreover, although the search engine (1) is depicted as a single device, it may be distributed across a network environment including one or more data storage means (not shown), databases, server computers, processors and although these are not explicitly shown, they are generically represented and encompassed by representation of the search engine (1).

Aspects of the present invention have been described by way of example only and it should be appreciated that modifications and additions may be made thereto without departing from the scope thereof.

What is claimed:

1. A computer-implemented method for providing search suggestions to a user entity, said method comprising:
   using a search engine comprising a social network, over a network to provide search suggestions having a search suggestion keyword selectable by the user entity, the search engine being configured to perform a search upon selection of said search suggestion keyword by the user entity, said network having a plurality of data input devices connected thereto, said social network including at least one computer and a database of entity data records, each data record relating to a corresponding entity and containing one or more entity attributes including at least one identifying characteristic of said corresponding entity;
   receiving and recording at least one keyword of at least one contact's search, the at least one contact's search including an interrogation of the database via the network for records including the at least one keyword, the at least one contact being an entity recorded as a contact in a user entity's private personal contact network, the private personal contacts network formed from entities connected directly or indirectly to the user entity, the connections being recorded in said database; and
   sending electronic data to a data input device associated with the user entity, the electronic data including indicative information, said indicative information including search suggestions derived from said at least one contact's search, said search suggestions including the at least one keyword of said at least one contact's search, provided as said search suggestions keyword,
   wherein the search suggestions keyword is derived independently of said user entity inputting any search keyword,
   wherein the search suggestions keyword is provided to the data input device associated with the user entity for display as a selectable user interface element on said data input device, and
   wherein the social network is configured to:
       perform a search of the database for records including the at least one keyword upon receiving data from the data input device indicating a selection of said user interface element by the user entity, and
       send data to the data input device, the data including an output listing of search results from said search.

2. The method as claimed in claim 1, wherein the electronic data includes the keywords from searches by multiple contacts.

3. The method as claimed in claim 1, wherein the electronic data includes interrelationship context information from said user entity's private personal contact network, the interrelationship context information including a connection factor between said user entity and said contact, the connection factor indicative of a degree of separation between said contact and said user entity.

4. The method as claimed in claim 1, wherein the electronic data includes interrelationship context information, the interrelationship context information including one or more entity attributes of said contact.

5. The method as claimed in claim 1, including receiving a selective input from the user entity to filter said search suggestions, said selective input being a selection of contacts, the contacts filtered according to at least one filter criteria, the filter criteria including at least one of: the interrelationship context information, the connection factor, entity attributes of the contact.

6. The method as claimed in claim 1, wherein the social network weights the search suggestions associated with the contacts providing the search suggestions most frequently chosen by the user entity.

7. The method as claimed in claim 1,
   wherein said social network is formed by:
       receiving input from said user entity including at least one identifying characteristic of the user entity,
       recording said identifying characteristic of said user entity in said corresponding entity data record in said database,
       receiving input from said user entity including at least one identifying characteristic of another user entity for inclusion as a said contact in said user entity's private personal contact network,
       recording said identifying characteristic of said contact in said user entity's data record in said database, and
       providing searchable access to said user entity of at least part of the entity data records stored in said database.

8. The method as claimed in claim 1, including:
   inviting other user entities to join said user entity's private personal contact network, and
   recording in the user entity's entity data record the other user entities joining said user entity's private personal contact network as contacts of the user entity.

9. A computer-implemented social network comprising a search engine system configured to provide search suggestions to a user entity, said social network comprising:
   said search suggestions providing search suggestion keyword selectable by the user entity, the social network configured to perform a search upon selection of said search suggestion keyword by the user entity, said social network being accessible over a network, said network having a plurality of data input devices;
   a receiving and recording resource comprising at least one computer and at least one database of entity data records, each data record relating to a corresponding entity and containing one or more entity attributes including at least one identifying characteristic of said corresponding entity,
   said receiving and recording resource receiving and recording at least one keyword of at least one contact's search, the at least one contact's search including an interrogation of the database via the network for the at least one keyword, the at least one contact being an entity recorded as a contact in a user entity's private personal contact network, the private personal contacts network formed from entities connected directly or indirectly to the user entity, the connections being recorded in said database;
   said receiving and recording resource sending electronic data to a data input device associated with the user entity, the electronic data including indicative information, said indicative information including search suggestions derived from said at least one contact's search, said search suggestions including the at least one keyword of said at least one contact's search, provided as said search suggestion keyword, wherein said search suggestion keyword is derived independently of said user entity inputting any search keyword and said search suggestion keyword is provided to the data input device associated with the user entity for display as a selectable user interface element on said data input device;

said receiving and recording resource receiving data from the data input device indicating a selection of a said search suggestion by the user entity selecting a selectable user interface element displayed on the data input device, and said receiving and recording resource performing a search, the search including interrogation of the database via the network for records including the at least one keyword, and send data to the data input device, the data including an output listing of search results from said search.

10. The method as claimed in claim 1, wherein the filter criteria include at least one entity attribute of the contact and, if the at least one entity attribute matches an entity attribute of an entity disconnected from the user entity, the search suggestion includes a prompt to invite said disconnected entity to connect to the user entity as a direct contact.

11. The method as claimed in claim 1, wherein the filter criteria include at least one entity attribute of the contact and, if the at least one entity attribute matches an entity attribute of an indirect contact, the search suggestion includes a prompt to invite said indirect contact to connect to the user entity as a direct contact.

12. The method as claimed in claim 1, wherein the keyword includes an entity attribute.

13. The method as claimed in claim 1, further including:
receiving data from the data input device indicating a selection of a said search suggestion keyword user interface element by the user entity, and
performing a search, the search including interrogation of the database via the network for records including the search suggestion keyword.

14. The method as claimed in claim 1, wherein in addition to the search suggestion keyword, the electronic data includes at least one identifying characteristic of the at least one contact.

15. The method as claimed in claim 1, wherein, in addition to the search suggestion keyword, the electronic data includes at least one search result from the at least one contact's search of said keyword.

16. The method as claimed in claim 13, wherein said electronic data sent to the data input device associated with the user entity includes the results of said search of the search suggestion keyword.

17. The method as claimed in claim 1, wherein a contact link is provided to the data input device associated with the user entity for display as a selectable user interface element on said data input device, the contact link providing contact to a user contact who last performed the search.

18. A computer-implemented mobile data input device for providing search suggestions to a user entity, said data input device connected to a search engine system comprising a social network, accessible over a network, said network having a plurality of data input devices connected thereto, said social network including at least one computer and a database of entity data records, each data record relating to a corresponding entity and containing one or more entity attributes including at least one identifying characteristic of said corresponding entity, the social network configured to receive and record at least one keyword of at least one contact's search, the at least one contact's search including an interrogation of the database via the network for records including the at least one keyword, the at least one contact being an entity recorded as a contact in a user entity's private personal contact network, the private personal contacts network formed from entities connected directly or indirectly to the user entity, the connections being recorded in the entity data records in said database, the data input device configured to:
receive electronic data from the social network including indicative information, said indicative information including search suggestions derived from said at least one contact's search, said search suggestions including the search suggestion keyword of said at least one contact's search, provided as said search suggestion keyword, the search suggestion keyword derived independently of said user entity inputting any search keyword, display the search suggestion keyword as a selectable user interface element;

record a selection of said user interface element;

send data to the social network indicating a selection of the user interface element, wherein the social network is configured to perform a search of the database for records including the at least one keyword, and receive and display data from the social network, the data including an output listing of search results.

19. The method as in claim 18, wherein said social network enables information flow between immediate acquaintances of said user entity as well as with subsequent tiers of entity acquaintances of said user entity.

* * * * *